United States Patent
Ohta et al.

[11] Patent Number: 5,954,866
[45] Date of Patent: Sep. 21, 1999

[54] INK FOR INK JET RECORDING AND IMAGE FORMING METHOD USING THE SAME

[75] Inventors: Hitoshi Ohta; Kiyohiko Takemoto, both of Suwa, Japan

[73] Assignee: Seiko Epson Corporation, Tokyo, Japan

[21] Appl. No.: 08/870,260

[22] Filed: Jun. 6, 1997

[30] Foreign Application Priority Data

Jun. 11, 1996 [JP] Japan ................................. 8-149611

[51] Int. Cl.$^6$ .................................................. C09D 11/02
[52] U.S. Cl. .................................. 106/31.89; 106/31.68; 106/31.69; 106/31.7; 106/31.71; 106/31.86; 428/195
[58] Field of Search .................. 106/31.89, 31.68, 106/31.69, 31.7, 31.71, 31.6, 31.86; 428/195

[56] References Cited

U.S. PATENT DOCUMENTS

| | | | |
|---|---|---|---|
| 5,338,597 | 8/1994 | Kurabayashi et al. | 106/31.27 |
| 5,614,007 | 3/1997 | Kurabayashi et al. | 106/31.27 |
| 5,700,314 | 12/1997 | Kurbayashi et al. | 106/31.27 |
| 5,792,249 | 8/1998 | Shirota et al. | 106/31.6 |

FOREIGN PATENT DOCUMENTS

| | | |
|---|---|---|
| 0571190 | 11/1993 | European Pat. Off. . |
| 60-056587 | 4/1985 | Japan . |
| 62-045675 | 2/1987 | Japan . |

OTHER PUBLICATIONS

Patent Abstracts of Japan of JP 60 056587, vol. 009, No. 191 (Aug. 1985).
Patent Abstracts of Japan of JP 62 045675, vol. 011, No. 232 (Jul. 1987).

*Primary Examiner*—Helene Klemanski
*Attorney, Agent, or Firm*—Ladas & Parry

[57] ABSTRACT

An ink composition for ink jet recording is provided which can meet many property requirements for an ink composition used in ink jet recording and, in addition, can yield a good image on a recording medium having a layer comprising a water-soluble resin. An ink jet recording method using the same is also provided. An ink composition comprising a pigment as a colorant, an anionic surfactant having a polyoxyethylene group, a dispersant, and water is used to record an image on a recording medium having a layer comprising a water-soluble resin by ink jet recording.

17 Claims, No Drawings

INK FOR INK JET RECORDING AND IMAGE FORMING METHOD USING THE SAME

BACKGROUND OF THE INVENTION

1. Field of the Invention

The present invention relates to an ink composition for ink jet recording and an image forming method using the same.

2. Background Art

Ink jet recording methods are classified into static electricity-driven ejection, air pressure-driven ejection, thermal bubble formation-driven ejection, piezoelectric device deformation-driven ejection and the like. In the ink jet recording methods, basically, ink droplets are generated and deposited onto a recording sheet to form an image.

Inks used in the ink jet recording are required to have properties including that the ink does not undergo any change in properties during storage, does not clog nozzles of the print head, does not yield an unacceptable image due to color-to-color intermixing (hereinafter referred to as "color bleeding") in an area where inks of different colors are superimposed on top of each other or one another, can yield a high-density image, and can yield an image possessing abrasion resistance, lightfastness, and waterfastness. Although water-soluble dyes have been mainly used as colorants for the ink in the above methods, use of inks using pigments has been proposed from the viewpoint of improving the lightfastness and the waterfastness of the image.

A number of proposals have been made on the formation of high-quality images not only by improving ink compositions but also by improving properties of recording media, such as ink absorption. Such recording media have been put on the market and widely used in the art. In most of these recording media, a layer comprising a water-soluble resin is provided on a substrate, and an ink is absorbed into the layer comprising a water-soluble resin to form an image.

SUMMARY OF THE INVENTION

The present inventors have now found that an ink composition comprising a pigment in combination with an anionic surfactant having a polyoxyethylene group can meet many property requirements for ink compositions used in ink jet recording and, in addition, can yield a good image on a recording medium having a layer comprising a water-soluble resin. The present invention has been made based on such finding.

Accordingly, an object of the present invention is to provide an ink composition which, by ink jet recording, can yield a high-quality image on a recording medium comprising a substrate bearing a layer comprised of a water-soluble resin.

Another object of the present invention is to provide an ink jet recording method using the above ink composition.

According to one aspect of the present invention, there is provided an ink composition for ink jet recording on a recording medium, comprising a pigment as a colorant, an anionic surfactant having a polyoxyethylene group, a dispersant, and water, wherein the recording medium comprises a substrate bearing a layer comprising a water-soluble resin.

DETAILED DESCRIPTION OF THE INVENTION

Recording medium

Recording media suitable for image recording using the ink composition of the present invention are such that a substrate bears a layer comprising a water-soluble resin.

In the present invention, the water-soluble resin is not particularly limited so far as it, when incorporated into the layer provided on the substrate, can absorb and fix an ink composition and develop a color of the ink composition. Specific examples of preferred water-soluble resins include nonionic resins having hydroxyl, carbonyl, polyethyleneoxyl, alkoxy, lactams, and ester groups as a functional group for rendering the resins water-soluble; cationic resins having salts of inorganic or organic acids of amino and imino groups as a functional group for rendering the resins water-soluble; anionic resins having alkali metal salts or ammonium salts of sulfonic, carboxylic, and phosphoric groups as a functional group for rendering the resins water-soluble; and amphoteric resins having a cationic functional group and an anionic functional group in combination as a functional group for rendering the resins water-soluble.

More specifically, examples of nonionic resins usable herein include synthetic resins, such as polyvinyl alcohol, polyvinyl pyrrolidone, polyvinyl methyl ether, polyethylene oxide, polyethylene glycol, polyethylene glycol monomethyl ether, polypropylene glycol, polyacrylamide, vinyl alcohol/vinyl acetate copolymer, partially formalated polyvinyl alcohol, partially butyralated polyvinyl alcohol, .polyvinyl butyral, and vinylpyrrolidone/vinyl acetate copolymer; cellulose derivatives, such as methyl cellulose, ethyl cellulose, hydroxyethyl cellulose, ethylhydroxyethyl cellulose, hydroxypropylmethyl cellulose, and hydroxypropyl cellulose; and starch derivatives, such as hydroxyalkyl starch, starch acetate, crosslinked starch, dextrin, and dextran.

Examples of cationic resins usable herein include starch derivatives, such as cationic starch, synthetic resins, such as poly(4-vinylpyridine) salts, polyamide, polyallylamine salt, and polyethyleneimine salt.

Examples of anionic resins usable herein include cellulose derivatives, such as carboxymethyl cellulose salts and viscose; naturally occurring resins, such as salts of alginic acid, gum arabic, tragacanth gum, and salts of ligninsulfonic acid; starch derivatives, such as starch phosphate and carboxymethyl starch salts; and synthetic resins, such as salts of polyacrylic acid, salts of polymethacrylic acid, salts of polyvinyl sulfate, salts of polyvinylsulfonic acid, salts of condensed naphthalenesulfonic acid, salts of poly(ethylene/acrylic acid), styrene/salt of acrylic acid copolymer, styrene/salt of methacrylic acid copolymer, acrylic ester/salt of acrylic acid copolymer, acrylic ester/salt of methacrylic acid copolymer, methacrylic ester/salt of acrylic acid copolymer, methacrylic ester/salt of methacrylic acid copolymer, styrene/salt of itaconic acid copolymer, itaconic ester/salt of itaconic acid copolymer, vinylnaphthalene/salt of acrylic acid copolymer, vinylnaphthalene/salt of methacrylic acid copolymer, and vinylnaphthalene/salt of itaconic acid copolymer.

Examples of amphoteric resins usable herein include naturally occurring resins, such as gelatin, albumin, and casein.

According to a preferred embodiment of the present invention, among the above water-soluble resins, polyvinyl alcohol derivatives, such as polyvinyl alcohol and/or vinyl alcohol/vinyl acetate copolymer, partially formalated polyvinyl alcohol, partially butyrated polyvinyl alcohol, and polyvinyl butyral are particularly preferred.

Substrates usable in the recording medium include papers comprising cellulose fibers, such as pulp, synthetic papers comprising synthetic resin fibers, and films prepared by sheeting of naturally occurring or synthetic resins, and preferred are synthetic resin films, such as films of polyethylene terephthalate (PET) and polyvinyl chloride (PVC).

A recording medium suitable for recording of an image using the ink composition of the present invention may be produced by a process which comprises: dissolving the above water-soluble resin in water and/or an organic solvent to prepare a coating liquid; either coating the coating liquid on a substrate by means of a roll coater, an air knife coater, a blade coater, a rod coater, a bar coater, a Komma coater, a gravure coater, a size press or the like or immersing the substrate in the coating liquid and pulling up the substrate from the coating liquid; and drying the coated substrate. The organic solvent is not particularly limited so far as it can dissolve the water-soluble resin. Examples of preferred organic solvents include alcoholic organic solvents, such as methanol, ethanol, 1-propanol, and isopropanol.

According to a preferred embodiment of the present invention, the thickness of the layer comprising a water-soluble resin in the recording medium is preferably not less than 5 $\mu$m on a dry basis. When the thickness is not less than 5 $\mu$m, the ink absorption is satisfactory and, at the same time, suitable drying rate and abrasion resistance of the image can be ensured.

Further, according to a preferred embodiment of the present invention, the addition of a cationic, anionic, amphoteric, or nonionic surfactant to the layer comprising a water-soluble resin (that is, addition of the coating liquid followed by coating of the coating liquid), or coating of the surfactant as a solution in water and/or an organic solvent on the layer comprising a water-soluble resin is preferred from the viewpoint of improving the wetting property of the ink. In this embodiment, examples of cationic surfactants usable herein include aliphatic amine salts, aliphatic quaternary ammonium salts, benzalkonium salts, benzethonium chloride, pyridinium salts, and imidazolinium salts. Examples of anionic surfactants usable herein include fatty acid soaps, N-acyl-N-methylglycine salts, N-acyl-N-methyl-$\beta$-alanine salts, salts of N-acylglutamic acid, salts of alkylether carboxylic acid, acylated peptide, salts of alkylsulfonic acid, salts of alkylbenzenesulfonic acid, salts of alkylnaphthalenesulfonic acid, polycondensate of salts of naphthalenesulfonic acid with formalin, salts of dialkylsulfosuccinic esters, salts of alkylsulfoacetic acids, salts of $\alpha$-olefinsulfonic acids, N-acylmethyltaurine, sulfated oils, higher alcohol sulfuric ester salts, secondary alcohol sulfuric ester salts, alkyl ether sulfates, secondary higher alcohol ethoxysulfates, polyoxyethylene alkylphenyl ether sulfates, monoglysulfates, fatty acid alkylol amidosulfuric ester salts, alkyl ether phosphoric ester salts, and alkylphosphoric ester salts. Examples of amphoteric surfactants usable herein include carboxybetaine type, sulfobetaine type, salts of aminocarboxylic acid, and imidazoliniumbetaine. Examples of nonionic surfactants usable herein include polyoxyethylene alkyl ethers, polyoxyethylene secondary alcohol ethers, polyoxyethylene alkylphenyl ethers, polyoxyethylene sterol ether, polyoxyethylene lanoline derivatives, ethylene oxide derivatives of alkyl phenol/formalin condensates, polyoxyethylene polyoxypropylene block polymer, polyoxyethylene polyoxypropylene alkyl ethers, polyoxyethylene glycerin fatty acid esters, polyoxyethylene castor oil, hardened castor oil, polyoxyethylene sorbitan fatty acid esters, polyoxyethylene sorbitol fatty acid esters, polyethylene glycol fatty acid esters, fatty acid monoglycerides, polyglyceride fatty acid esters, sorbitan fatty acid esters, propylene glycol fatty acid esters, sucrose fatty acid esters, fatty acid alkanolamides, polyoxyethylene fatty acid amide, polyoxyethylene alkylamines, alkylamine oxides, acetylene glycol, and acetylene alcohol.

According to a preferred embodiment of the present invention, the addition of various additives to the layer comprising a water-soluble resin (that is, addition of the coating liquid followed by coating of the coating liquid), or coating of the additives as a solution in water and/or an organic solvent on the layer comprising a water-soluble resin is preferred from the viewpoint of improving the ink absorption and color development of the recording medium. Examples of additives usable herein include silica, alumina, clay, talc, diatomaceous earth, calcium carbonate, calcium sulfate, barium sulfate, aluminum silicate, magnesium silicate, basic magnesium carbonate, magnesium hydroxide, titanium oxide, synthetic zeolite, zinc oxide, and white clay.

Ink composition

The ink composition according to the present invention basically comprises a pigment as a colorant, an anionic surfactant having a polyoxyethylene group, a dispersant, and water.

The ink composition according to the present invention meets many property requirements for the ink composition used in ink jet recording. In particular, the ink composition according to the present invention is less likely to cause clogging of the nozzles. Even though the ink composition according to the present invention dries at the front end of the nozzles and clogs the nozzles, the dried ink can be easily removed by cleaning operation. This permits ink jet recording to be stably performed. Further, when the ink composition according to the present invention is used to record an image on the recording medium having a layer comprising a water-soluble resin by ink jet recording, the ink is laterally spread in the layer to increase dot diameter. This permits a blotted image (100% duty) to be formed even when the amount of the ink is small. That is, use of a small amount of the ink suffices for realizing a high-quality image. When the dot diameter is unsatisfactory, no good blotted image can be formed, leading to a fear that an unacceptable image such as that suffering from dropouts is formed. Increasing the amount of the ink deposited is considered effective for ensuring the dot diameter. However, there is a limitation on the amount of the ink absorbed into the layer comprising a water-soluble resin, and the amount of the ink exceeding the limit leads to a fear that feathering of the image is created. Further, in order to realize a color image, a plurality of ink compositions should be deposited on a recording medium. Therefore, in some cases, the amount of the ink deposited cannot be simply increased. The ink composition of the present invention, even when used in a small amount, can realize a high-quality image on a recording medium having a layer comprising a water-soluble resin. Thus, the ink composition of the present invention can expand the applicability of the recording medium having a layer comprising a water-soluble resin.

In the ink composition according to the present invention, inorganic and organic pigments may be used as the pigment without any particular limitation. Specific examples of pigments usable herein include black pigments, such as carbon blacks (C.I. Pigment Black 7), such as furnace black, lamp black, acetylene black, and channel black, metal oxides, such as copper oxide, iron oxide (C.I. Pigment Black 11), and titanium oxide, and organic pigments, such as aniline black (C.I. Pigment Black 1); yellow pigments, such as Fast Yellow G (C.I. Pigment Yellow 1), disazo yellow AAA (C.I.

Pigment Yellow 12), yellow iron oxide (C.I. Pigment Yellow 42), disazo yellow HR (C.I. Pigment Yellow 83), and C.I. Pigment Yellow 3, 13, 14, 17, 24, 34, 35, 37, 53, 55, 81, 95, 97, 98, 100, 101, 104, 108, 109, 110, 117, 120, 138, and 153; magenta pigments, such as Brilliant Fast Scarlet (C.I. Pigment Red 22), Permanent Red 2B (Ba), (C.I. Pigment Red 48:2), Permanent Red 2B (Ca) (C.I. Pigment Red 48:2), Permanent Red 2B (Sr) (C.I. Pigment Red 48:3), Permanent Red 2B (Mn) (C.I. Pigment Red 48:4), Brilliant Carmine 6B (C.I. Pigment Red 57:1), Rhodamine 6G Lake (C.I. Pigment Red 81), iron oxide red (C.I. Pigment Red 101), Cadmium Red (C.I. Pigment Red 108), Quinacridone Magenta (C.I. Pigment Red 122), C.I. Pigment Red 1, 2, 3, 5, 17, 23, 31, 38, 49:1, 52:2, 53:1, 60:1, 63:1, 63:2, 64:1, 83, 88, 104, 105, 106, 112, 114, 123, 146, 149, 166, 168, 170, 172, 177, 178, 179, 185, 190, 193, 209, and 219; cyan pigments, such as Phthalocyanine Blue R (C.I. Pigment Blue 15), Phthalocyanine Blue G (C.I. Pigment Blue 15:3), Phthalocyanine Blue E (C.I. Pigment Blue 15:6), C.I. Pigment Blue 1, 2, 15:1, 15:2, 15:4, 16, 17:1, 56, 60, and 63.

In the ink composition according to the present invention, one or more pigments may be added according to need. The amount of the pigment added to the ink is preferably in the range of from 0.5 to 30% by weight. When the amount is not less than 0.5% by weight, satisfactory image density can be provided. On the other hand, when it is not more than 30% by weight, the storage stability of the ink can be ensured and the viscosity of the ink can be modified so that the ink can be ejected by the ink jet recording method.

In the ink composition of the present invention, a dispersant is used in order to stably disperse the pigment. Preferred dispersants include known dispersants used in the preparation of known pigment dispersions, for example, polymer dispersants and surfactants.

Preferred examples of the polymer dispersant include naturally occurring polymers, and examples thereof include proteins such as glue, gelatin, casein, and albumin; naturally occurring rubbers such as gum arabic and tragacanth gum; glucosides such as saponin; alginic acid and alginic acid derivatives such as a propylene glycol ester of alginic acid, triethanolamine alginate, and ammonium alginate; and cellulose derivatives such as methyl cellulose, carboxymethyl cellulose, hydroxyethyl cellulose, and ethylhydroxyethyl cellulose.

Further preferred examples of the polymer dispersant include synthetic polymers including polyvinyl alcohols; polyvinyl pyrrolidones; acrylic resins such as polyacrylic acid, polymethacrylic acid, a copolymer of acrylic acid with acrylonitrile, a copolymer of potassium acrylate with acrylonitrile, a copolymer of vinyl acetate with an acrylic ester, and a copolymer of acrylic acid with an alkyl ester of acrylic acid; styrene/acrylic acid resins such as a copolymer of styrene with acrylic acid, a copolymer of styrene with methacrylic acid, a copolymer of styrene with acrylic acid and an alkyl ester of acrylic acid, a copolymer of styrene with methacrylic acid and an alkyl ester of acrylic acid, a copolymer of styrene with 60 -methylstyrene and acrylic acid, a copolymer of styrene with α-methylstyrene, acrylic acid and an alkyl ester of acrylic acid; a copolymer of styrene with maleic acid; a copolymer of styrene with maleic anhydride; a copolymer of vinylnaphthalene with acrylic acid; a copolymer of vinylnaphthalene with maleic acid; and vinyl acetate copolymers such as a copolymer of vinyl acetate with ethylene, a copolymer of vinyl acetate with fatty acid vinylethylene, a copolymer of vinyl acetate with a maleic ester, a copolymer of vinyl acetate with crotonic acid, and a copolymer of vinyl acetate with acrylic acid; and salts of the above polymers. Among them, a copolymer of a monomer having a hydrophobic group with a monomer having a hydrophilic group and a polymer of a monomer having a combination of a hydrophobic group with a hydrophilic group are particularly preferred. Example of the above salt include diethylamine, ammonium, ethylamine, triethylamine, propylamine, isopropylamine, dipropylamine, butylamine, isobutylamine, triethanolamine, diethanolamine, aminomethyl propanol, and morpholine salts. A water-soluble resin soluble in a solution of an amine or other bases in water is particularly preferred. The weight average molecular weight of the above copolymer is preferably 3,000 to 30,000, still preferably 5,000 to 15,000.

Examples of surfactants preferable as the dispersant include anionic surfactants such as a salt of a fatty acid, a salt of a higher alkyldicarboxylic acid, a salt of a higher alcohol sulfuric ester, a salt of a higher alkylsulfonic acid, a condensate of a higher fatty acid with an amino acid, a salt of a sulfosuccinic ester, a salt of naphthenic acid, a salt of a liquid fatty oil sulfuric ester, and a salt of an alkylallylsulfonic acid; cationic surfactants such as a fatty acid amine salt, a quaternary ammonium salt, a sulfonium salt, and a phosphonium salt; and nonionic surfactants such as a polyoxyethylene alkyl ether, a polyoxyethylene alkyl ester, a sorbitan alkyl ester, and a polyoxyethylene sorbitan alkyl ester.

Particularly preferred resin dispersants are such that a styrene/acrylic acid copolymer constitutes the molecular skeleton and the weight-average molecular weight (hereinafter referred to as "MW") is 1,600 to 25,000 with the acid value (hereinafter referred to as "AV") being 100 to 250. Such dispersants are commercially available, and examples thereof include those commercially available from Johnson Polymer Corp., such as Joncryl 68 (MW: 10,000, AV: 195), Joncryl 679 (MW: 7,000, AV: 200), Joncryl 680 (MW: 3,900, AV: 215), Joncryl 682 (MW: 1,600, AV: 235), Joncryl 550 (MW: 7,500, AV: 200), Joncryl 555 (MW: 5,000, AV: 200), Joncryl 586 (MW: 3,100, AV: 105), Joncryl 683 (MW: 7,300, AV: 150), and B-36 (MW: 6,800, AV: 250). The amount of the dispersant added is preferably in the range of from 0.05 to 30% by weight based on the pigment.

According to a preferred embodiment of the present invention, the addition of an additive capable of forming a salt with the above resin dispersant is preferred from the viewpoint of dissolving the resin dispersant in the ink. Preferred examples of such additives include aminomethyl propanol, 2-amino-isopropanol, triethanolamine, morpholine, and ammonia. The use of the above additive in an amount of a neutral equivalent of the resin dispersant or larger suffices for attaining the contemplated purpose. Further, preferably, isopropylene glycol, 2-propanol or the like may be added as a dissolution aid of the resin dispersant.

Examples of anionic surfactants having a polyoxyethylene group which may be used in the ink composition according to the present invention include polyoxyethylene alkyl ether sulfates, polyoxyethylene alkylphenyl ether sulfates, polyoxyethylene styrenated phenyl ether sulfates, polyoxyethylene alkyl ether phosphates, and polyoxyethylene alkylphenyl ether phosphates. Among them, polyoxyethylene alkyl phenyl ether sulfates are preferred with polyoxyethylene nonylphenyl ether sulfates being most preferred. Counter ions capable of forming salts with such anionic surfactants include inorganic ions, such as potassium, sodium, and ammonium ions, and organic amines, such as monoethanolamine, diethanolamine, and triethanolamine. Among them, ammonium ions are most preferred. They may be added either alone or in any combination of two or more of them.

In the ink composition according to the present invention, the anionic surfactant is expected to act in such a manner that the recording medium is evenly wetted with the ink while ensuring the storage stability of the ink composition. The amount of the anionic surfactant added may be suitably determined so that the effect of the present invention can be attained and, especially, the above action can be realized. For example, it is preferably in the range of from 0.01 to 5.0% by weight. When the amount of the anionic surfactant added is in the above range, redispersion of the pigment in water by the anionic surfactant can be inhibited, advantageously ensuring better water resistance of the printed image.

According to a preferred embodiment of the present invention, the ink composition according to the present invention may further comprise a resin emulsion and/or a saccharide.

The addition of the resin emulsion permits color bleeding to be effectively prevented and, in addition, results in further improved storage stability of the ink composition. The reason why this effect can be attained has not been elucidated yet, it is believed as follows. Interaction between the resin emulsion and the pigment in the ink composition results in improved dispersion stability of the pigment. This interaction occurs also upon superposition of inks of different colors at the time of the formation of an image, increasing the apparent particle diameter to inhibit mixing of the inks, which results in the prevention of color bleeding.

The addition of the saccharide can offer the effect of improving the color development of an image formed on the recording medium having a layer comprising a water-soluble resin. Although the reason why this effect can be attained has not been elucidated yet, it is believed to reside in that the addition of the saccharide permits the ink composition to be evenly penetrated into the layer comprising a water-soluble resin. This effect can be further improved by the addition of a resin emulsion containing a saccharide.

In the present invention, the resin emulsion refers to an emulsion comprising a continuous phase of water and a dispersed phase of the following resin component. Specific examples of resin components usable in the dispersed phase include styrene/acrylic ester copolymer, polyacrylic ester, polymethacrylic ester, styrene/methacrylic ester copolymer, polystyrene, polyethylacrylic ester, styrene/butadiene copolymer, acrylonitrile/butadiene copolymer, chloroprene copolymer, crosslinked acrylic resin, crosslinked styrene resin, fluororesin, vinylidene fluoride resin, benzoguanamine resin, polyolefin resin, styrene/acrylamide copolymer, n-isobutyl acrylate resin, polyacrylonitrile, vinyl acetate resin, polyacrylamide, polyvinyl acetal, rosin resin, polyethylene, polyvinylidene chloride, ethylene/vinyl acetate copolymer, vinyl acetate/acrylic acid copolymer, and polyvinyl chloride. These resin components are preferably polymers having both a hydrophilic portion and a hydrophobic portion.

The particle diameter of the resin component is not particularly limited so far as an emulsion can be formed. However, it is preferably not more than 150 nm from the viewpoint of ensuring the dispersion stability.

Further, commercially available resin emulsions may also be used, and examples thereof include Microgel E-1002 and E-5002 (styrene/acrylic resin emulsion, manufactured by Nippon Paint Co., Ltd.), SAE-1014 (styrene/acrylic resin emulsion, manufactured by Nippon Zeon Co., Ltd.), and Saivinol SK-200 (acrylic resin emulsion, manufactured by Saiden Chemical Industry Co., Ltd).

The above resin emulsion may be added either alone or in combination of two or more according to need. The amount of the resin emulsion added to the ink is preferably in the range of from 0.1 to 5% by weight in terms of the resin solid content.

Saccharides which may be added to the ink composition of the present invention include monosaccharides, disaccharides, oligosaccharides (including trisaccharides and tetrasaccharides), and other polysaccharides and derivatives thereof. Specific examples thereof include glucose, mannose, fructose, ribose, xylose, arabinose, galactose, glucitol (sorbitol), maltose, maltitol, cellobiose, lactose, sucrose (saccharose), trehalose, and maltotriose. Further examples thereof include reducing sugars of the above saccharides (specifically, sugar alcohols represented by the general formula $HOCH_2(CHOH)_nCH_2OH$, wherein n is an integer of 2 to 5), oxidizing sugars (specifically, aldonic acid or uronic acid), amino acids, and thiosugars. The term "poloysaccharide" used herein means saccharides in the broad sense as including substances which exist widely in the world of nature, such as alginic acid, $\alpha$-cyclodextrin, and cellulose. The saccharides may be used either alone or in combination of two or more.

The amount of the saccharide added to the ink composition is preferably in the range of from 0.1 to 40% by weight. When it is in the above range, good moisture retention can be imparted to the ink composition and, at the same time, the viscosity of the ink can be modified so that the ink can be ejected by the ink jet recording method.

Pure water and ultrapure water, such as ion-exchanged water, water purified by ultrafiltration or reverse osmosis, and distilled water, are preferred as water for constituting the ink composition according to the present invention. When the ink is stored for a long period of time, use of water sterilized by ultraviolet irradiation, treatment with hydrogen peroxide or the like is preferred from the viewpoint of preventing growth of mold and bacteria.

The ink composition of the present invention may further comprises a humectant from the viewpoints of preventing clogging of nozzles and improving the moisture retention and storage stability.

The humectant is preferably a water-soluble, high-boiling, low-volatile organic solvent. Specific examples thereof include alcohols, such as ethylene glycol, propylene glycol, 1,3-butanediol, 1,4-butanediol, 1,5-pentanediol, 2-butene-1, 4-diol, 2-methyl-2,4-pentanediol, glycerin, and 1,2,6-hexanetriol; ethers, such as diethylene glycol dimethyl ether, diethylene glycol diethyl ether, diethylene glycol mono-n-butyl ether, triethylene glycol mono-n-butyl ether; ketones, such as acetonylacetone and methyl ethyl ketone; esters, such as $\gamma$-butyrolactone, diacetin, ethylene carbonate, and triethyl phosphate; nitrogen compounds, such as formamide, dimethyl formamide, diethyl formamide, dimethyl acetamide, 2-pyrrolidone, and N-methyl-2-pyrrolidone; sulfur compounds, such as dimethyl sulfoxide, sulfolane, and 1,3-propane sultone; carboxylic acid amides, such as lactamide, acetamide, N-methylacetamide, methyl carbamate, ethyl carbamate, $\epsilon$-caprolactam, $\gamma$-valerolactam, $\alpha$-pyridone, and isatin; carboxylic acid derivatives for lactones, such as gluconic lactone; and polyfunctional compounds, such as 2-amino-2-hydroxymethyl-1,3-propanediol, 2-amino-2-methyl-1-propanol, bis(hydroxyethyl)terephthalate , N,N'-dimethyl-1,3-propanediamine, 2,2-dimethyl-1,3-propanediol, ethyl gallic acid, 2-ethyl-2-(hydroxymethyl)-1,3-propanediol, glutaric anhydride, glycol amide, 2-hydroxymethyl-2-methyl-1,3-propanediol, imidazole, 2-imidazolidinone, nicotinamide, 1,1',1"-nitro-tri-2-propanol, succinimide, 1,2,3,6-tetrahydrophtalimide, N,N,N',N'-tetrakis(2-hydroxyethyl)

ethylenediamine, N,N,N',N'-tetrakis(2-hydroxypropyl) ethylenediamine, thiourea, 2,2,4-trimethyl-1,3-pentanediol, 2-methoxyethanol, 2-ethoxyethanol, 2-(methoxymethoxy) ethanol, 2-isopropoxyethanol, 2-butoxyethanol, 2-isopentyloxyethanol, furfuryl alcohol, tetrahydrofurfuryl alcohol, diethylene glycol, ethylene glycol monomethyl ether, diethylene glycol monomethyl ether, diethylene glycol monoethyl ether, diethylene glycol monobutyl ether, triethylene glycol, triethylene glycol monomethyl ether, tetraethylene glycol, propylene glycol monomethyl ether, propylene glycol monoethyl ether, dipropylene glycol, dipropylene glycol monomethyl ether, dipropylene glycol monoethyl ether, tripropylene glycol monomethyl ether, diacetone alcohol, monoethanol amine, thiodiglycol, morpholine, N-ethylmorpholine, 2-methoxyethyl acetate, diethylene glycol monoethyl ether acetate, and hexamethylphosphoramide. These water-soluble organic solvents may be added either alone or in combination of two or more according to need. The amount of the water-soluble organic solvent added to the ink is preferably 0.1 to 30% by weight.

According to a preferred embodiment of the present invention, a high-volatile, water-soluble organic solvent capable of accelerating the drying of the ink is added from the viewpoint of improving image formation rate. Preferred examples of such organic solvents include monovalent alcohols, such as methanol, ethanol, 1-propanol, 2-propanol, 1-butanol, isobutanol, 2-butanol, and 2-methyl-2-propanol.

Further, according to a preferred embodiment of the present invention, addition of a pH adjustor is preferred from the viewpoint of further improving the dispersion stability of the pigment and the resin emulsion. Specific examples of pH adjustors include alkali metals, such as sodium hydroxide, potassium hydroxide, lithium hydroxide, sodium carbonate, sodium hydrogencarbonate, potassium carbonate, lithium carbonate, sodium phosphate, potassium phosphate, lithium phosphate, potassium dihydrogenphosphate, dipotassium hydrogenphosphate, sodium oxalate, potassium oxalate, lithium oxalate, sodium borate, sodium tetraborate, potassium hydrogenphthalate, and potassium hydrogenphthalate; and amines, such as ammonia, methylamine, ethylamine, diethylamine, and tris(hydroxymethyl)aminomethane hydrochloride.

In the ink composition of the present invention, assistants for ink jet recording inks commonly used in the conventional ink jet recording inks, such as surface tension modifiers, antimold, chelating agents, preservatives, rust preventives, antioxidants, and ultraviolet absorbers, may be added according to need.

The ink composition of the present invention may be prepared by a conventional method. A preferred method comprises mixing a pigment, a resin dispersant, and water and, if necessary, an additive capable of forming a salt with the dispersant together by means of a dispergator, such as a ball mill, a sand mill, an attritor, a roll mill, an agitator mill, a Henschel mixer, a colloid mill, an ultrasonic homogenizer, a jet mill, or an Ong mill, dispersing the ingredients until the average particle diameter of the pigment reaches 100 to 200 nm, and adding suitable other ingredients. Thereafter, filtration using a metallic filter, a membrane filter or the like or centrifugation is preferably carried out in order to remove coarse particles and foreign matter causative of clogging of nozzle holes.

EXAMPLES

The present invention will be described in more detail with reference to the following examples.

Preparation of Ink Compositions

Example 1

(Pigment)
 Furnace black (C.I. Pigment Black 7) . . . 3.0 wt %
(Resin dispersant)
 Joncryl 679 (tradename, styrene/acrylic acid copolymer, MW: 7,000, AV: 200, manufactured by Johnson Polymer Corp.) . . . 0.6 wt %
(Additives for resin dispersant)
 Triethanolamine . . . 1.31 wt %
 2-Propanol . . . 0.06 wt %
(Resin emulsion)
 Styrene/acrylic ester resin emulsion (resin solid content: 40 wt %, MFT: about 85° C.) . . . 3.75 wt %
(Anionic surfactant)
 Hitenol N07 (tradename, polyoxyethylene nonylphenyl ether ammonium sulfate, active ingredient: 92 wt %, manufactured by Dai-ichi Kogyo Seiyaku Co., Ltd.) . . . 0.8 wt %
(Saccharide)
 Maltitol . . . 7.0 wt %
(Humectant)
 Glycerin . . . 11.0 wt %
 2-Pyrrolidone . . . 2.0 wt %
(pH adjustor)
 Potassium hydroxide . . . 0.1 wt %
(Preservative)
 Proxel . . . 0.3 wt %
(Water)
 Ultrapure water . . . 70.08 wt %

An ink composition was prepared as follows.

At the outset, Joncryl 679, triethanolamine, 2-propanol, and ultrapure water were mixed together, and the mixture was heated to 70° C. to completely dissolve the ingredients. The furnace black was then added to the solution, followed by premixing for about 30 min. Thereafter, Eiger Motormill (manufactured by Eiger Japan K. K.) was used to disperse the furnace black under conditions of bead loading 70% and media diameter 0.7 mm until the average particle diameter of the pigment was reduced to 100 nm. After the completion of the dispersing procedure, a styrene/acrylic ester resin emulsion, glycerin, 2-pyrrolidone, Hitenol N07, maltitol, potassium hydroxide, and Proxel were added to and mixed with the dispersion while stirring by means of a mechanical stirrer for one hr. The mixture was filtered under pressure through a 5-μm membrane filter to prepare a black ink of Example 1.

In this ink of Example 1, glycerin and 2-pyrrolidone were added as humectants, and potassium hydroxide was added as a pH adjustor.

Example 2

(Pigment)
 C.I. Pigment Yellow 109 . . . 3.0 wt %
 C.I. Pigment Yellow 110 . . . 0.5 wt %
(Resin dispersant)
 Joncryl 679 (tradename, styrene/acrylic acid copolymer, MW: 7,000, AV: 200, manufactured by Johnson Polymer Corp.) . . . 0.7 wt %
(Additives for resin dispersant)
 Triethanolamine . . . 1.38 wt %
 2-Propanol . . . 0.07 wt %
(Resin emulsion)
 Styrene/acrylic ester resin emulsion (resin solid content: 40 wt %, MFT: about 85° C.) . . . 3.75 wt %
(Anionic surfactant)
 Hitenol N07 (tradename, polyoxyethylene nonylphenyl ether ammonium sulfate, active ingredient: 92 wt %, manufactured by Dai-ichi Kogyo Seiyaku Co., Ltd.) . . . 0.8 wt %
(Saccharide)
 Maltitol . . . 7.0 wt %

(Humectant)
  Glycerin . . . 9.0 wt %
  2-Pyrrolidone . . . 2.0 wt %
(pH adjustor)
  Potassium hydroxide . . . 0.1 wt %
(Preservative)
  Proxel . . . 0.3 wt %
(Water)
  Ultrapure water . . . 71.4 wt %

A yellow ink of Example 2 was prepared according to the above formulation in the same manner as in Example 1.

In this ink of Example 2, glycerin and 2-pyrrolidone were added as humectants, and potassium hydroxide was added as a pH adjustor.

Example 3

(Pigment)
  Quinacridone Magenta (C.I. Pigment Red 122) . . . 3.0 wt %
(Resin dispersant)
  Joncryl 679 (tradename, styrene/acrylic acid copolymer, MW: 7,000, AV: 200, manufactured by Johnson Polymer Corp.) . . . 0.6 wt %
(Additives for resin dispersant)
  Triethanolamine . . . 1.31 wt %
  2-Propanol . . . 0.06 wt %
(Resin emulsion)
  Styrene/acrylic ester resin emulsion (resin solid content: 40 wt %, MFT: about 85° C.) 3.75 wt %
(Anionic surfactant)
  Hitenol N07 (tradename, polyoxyethylene nonylphenyl ether ammonium sulfate, active ingredient: 92 wt %, manufactured by Dai-ichi Kogyo Seiyaku Co., Ltd.) . . . 0.8 wt %
(Saccharide)
  Maltitol . . . 7.0 wt %
(Humectant)
  Glycerin . . . 12.0 wt %
  2-Pyrrolidone . . . 2.0 wt %
(pH adjustor)
  Potassium hydroxide . . . 0.1 wt %
(Preservative)
  Proxel . . . 0.3 wt %
(Water)
  Ultrapure water . . . 69.08 wt %

A magenta ink of Example 3 was prepared according to the above formulation in the same manner as in Example 1.

In this ink of Example 3, glycerin and 2-pyrrolidone were added as humectants, and potassium hydroxide was added as a pH adjustor.

Example 4

(Pigment)
  Phthalocyanine blue G (C.I. Pigment Blue 15:3) . . . 2.0 wt %
(Resin dispersant)
  Joncryl 679 (tradename, styrene/acrylic acid copolymer, MW: 7,000, AV: 200, manufactured by Johnson Polymer Corp.) . . . 0.4 wt %
(Additives for resin dispersant)
  Triethanolamine . . . 1.17 wt %
  2-Propanol . . . 0.04 wt %
(Resin emulsion)
  Styrene/acrylic ester resin emulsion (resin solid content: 40 wt %, MFT: about 85° C.) . . . 3.75 wt %
(Anionic surfactant)
  Hitenol N07 (tradename, polyoxyethylene nonylphenyl ether ammonium sulfate, active ingredient: 92 wt %, manufactured by Dai-ichi Kogyo Seiyaku Co., Ltd.) . . . 0.4 wt %
(Saccharide)
  Maltitol . . . 7.0 wt %
(Humectant)
  Glycerin . . . 15.0 wt %
  2-Pyrrolidone . . . 2.0 wt %
(pH adjustor)
  Potassium hydroxide . . . 0.1 wt %
(Preservative)
  Proxel . . . 0.3 wt %
(Water)
  Ultrapure water . . . 67.84 wt %

A cyan ink of Example 4 was prepared according to the above formulation in the same manner as in Example 1.

In this ink of Example 4, glycerin and 2-pyrrolidone were added as humectants, and potassium hydroxide was added as a pH adjustor.

Example 5

(Pigment)
  Channel black, (manufactured by Mitsubishi Kasei Corp.) . . . 0.5 wt %
(Resin dispersant)
  Joncryl 68 (tradename, styrene/acrylic acid copolymer, MW: 10,000, AV: 195, manufactured by Johnson Polymer Corp.) . . . 0.15 wt %
(Additives for resin dispersant)
  Aminomethylpropanol . . . 1.0 wt %
  Propylene glycol . . . 0.1 wt %
(Resin emulsion)
  Microgel E-1002 (tradename, styrene/acrylic acid resin emulsion, resin solid content: 20 wt %, MFT: about 80° C., manufactured by Nippon Paint Co., Ltd.) . . . 0.5 wt %
(Anionic surfactant)
  Emal 20T (tradename, polyoxyethylene alkyl ether triethanolamine sulfate, active ingredient: 40 wt %, manufactured by Kao Corp.) . . . 0.03 wt %
(Saccharides)
  Glucitol . . . 0.1 wt %
(Humectant)
  Glycerin . . . 0.1 wt %
(Preservative)
  Proxel . . . 0.3 wt %
(Water)
  Ultrapure water . . . 97.22 wt %

A black ink of Example 5 was prepared according to the above formulation in the same manner as in Example 1.

In this ink of Example 5, glycerin was added as a humectant.

Example 6

(Pigment)
  C.I. Pigment Yellow 17 . . . 30.0 wt %
(Resin dispersant)
  Joncryl 680 (tradename, styrene/acrylic acid copolymer, MW: 3,900, AV: 215, manufactured by Johnson Polymer Corp.) . . . 9.0 wt %
(Additives for resin dispersant)
  Aqueous ammonia (30 wt %) . . . 15.0 wt %
  2-Propanol . . . 0.9 wt %
(Resin emulsion)
  SAE 1014 (tradename, styrene/acrylic acid resin emulsion, resin solid content: 40 wt %, MFT: 70–90° C., manufactured by Nippon Zeon Co., Ltd.) . . . 5.0 wt %
(Anionic surfactant)
  Newcol 1305SN (tradename, polyoxyethylene tridecyl ether sodium sulfate, active ingredient: 30 wt %, manufactured by Nippon Nyukazai K.K.) . . . 5.0 wt %

(Saccharides)
  Lactose . . . 0.5 wt %
(Humectant)
  N-methyl-2-pyrrolidone . . . 1.0 wt %
(Water)
  Ultrapure water . . . 33.6 wt %

A yellow ink of Example 6 was prepared according to the above formulation in the same manner as in Example 1.

In this ink of Example 6, N-methyl-2-pyrrolidone was added as a humectant.

Example 7

(Pigment)
  Brilliant fast scarlet (C.I. Pigment Red 22) . . . 10.0 wt %
(Resin dispersant)
  Joncryl 555 (tradename, styrene/acrylic acid copolymer, MW: 5,000, AV: 200, manufactured by Johnson Polymer Corp.) . . . 1.0 wt %
(Additives for resin dispersant)
  Morpholine . . . 2.0 wt %
(Resin emulsion)
  SG-60 (tradename, styrene/acrylic resin emulsion, resin solid content: 40 wt %, MFT: 90° C., manufactured by K.K. Gifu Seramikku Seizousho) . . . 12.5 wt %
(Anionic surfactant)
  Hitenol N17 (tradename, polyoxyethylene nonylphenyl ether ammonium sulfate, active ingredient: 92 wt %, manufactured by Dai-ichi Kogyo Seiyaku Co., Ltd.) . . . 5.43 wt %
(Saccharide)
  Maltitol . . . 10.0 wt %
  Fructose . . . 5.0 wt %
(Humectant)
  Diethylene glycol . . . 30.0 wt %
  Diethylene glycol monobutyl ether . . . 1.0 wt %
(Water)
  Ultrapure water . . . 23.07 wt %

A magenta ink of Example 7 was prepared according to the above formulation in the same manner as in Example 1.

In this ink of Example 7, diethylene glycol and diethylene glycol monobutyl ether were added as humectants.

Example 8

(Pigment)
  Phthalocyanine blue R (C.I. Pigment Blue 15) . . . 1.0 wt %
(Resin dispersant)
  Joncryl 682 (tradename, styrene/acrylic acid copolymer, MW: 1,600, AV: 235, manufactured by Johnson Polymer Corp.) . . . 0.1 wt %
(Additives for resin dispersant)
  Triethanolamine . . . 0.07 wt %
  2-Propanol . . . 0.01 wt %
(Resin emulsion)
  Saivinol SK-200 (tradename, acrylic resin emulsion, resin solid content: 50 wt %, MFT: 80° C. or above, manufactured by Saiden Chemical Industry Co., Ltd.) . . . 6.0 wt %
(Anionic surfactant)
  Emal E-70C (tradename, polyoxyethylene lauryl ether sodium sulfate, active ingredient: 70 wt %, manufactured by Kao Corp.) . . . 1.0 wt %
(Saccharides)
  Arabinose . . . 0.04 wt %
  Trehalose . . . 0.03 wt %
  Cellobiose . . . 0.03 wt %
(Humectant)
  Triethylene glycol . . . 0.1 wt %
(Water)
  Ultrapure water . . . 91.62 wt %

A cyan ink of Example 8 was prepared according to the above formulation in the same manner as in Example 1.

In this ink of Example 8, triethylene glycol was added as a humectant.

Example 9

(Pigment)
  Channel black (C.I. Pigment Black 7) . . . 30.0 wt %
(Resin dispersant)
  Joncryl 586 (tradename, styrene/acrylic acid copolymer, MW: 3,100, AV: 105, manufactured by Johnson Polymer Corp.) . . . 3.0 wt %
(Additives for resin dispersant)
  Triethanolamine . . . 2.03 wt %
  2-Propanol . . . 0.3 wt %
(Resin emulsion)
  Styrene/acrylic ester resin emulsion (resin solid content: 50 wt %, MFT: 60° C.) . . . 1.0 wt %
(Anionic surfactant)
  Emal 20T (tradename, polyoxyethylene alkyl ether triethanolamine sulfate, active ingredient: 40 wt %, manufactured by Kao Corp.) . . . 0.03 wt %
(Saccharides)
  Glucitol . . . 40.0 wt %
(Water)
  Ultrapure water . . . 23.64 wt %

A black ink of Example 9 was prepared according to the above formulation in the same manner as in Example 1.

Example 10

(Pigment)
  Disazo yellow HR (C.I. Pigment Yellow 83) . . . 5.0 wt %
(Resin dispersant)
  Joncryl 550 (tradename, styrene/acrylic acid copolymer, MW: 7,500, AV: 200, manufactured by Johnson Polymer Corp.) . . . 0.05 wt %
(Additives for resin dispersant)
  Aminomethyl propanol . . . 0.5 wt %
(Resin emulsion)
  Polyacrylonitrile resin emulsion (resin solid content: 50 wt %, MFT: 85° C.) . . . 9.0 wt %
(Anionic surfactant)
  Newcol 560SN (tradename, polyoxyethylene nonylphenyl ether sodium sulfate, active ingredient: 30 wt %, manufactured by Nippon Nyukazai K.K.) . . . 5.0 wt %
(Saccharides)
  Lactose . . . 7.0 wt %
(Water)
  Ultrapure water . . . 73.45 wt %

A yellow ink of Example 10 was prepared according to the above formulation in the same manner as in Example 1.

Example 11

(Pigment)
  Brilliant carmine 6B (C.I. Pigment Red 57:1) . . . 8.0 wt %
(Resin dispersant)
  B-36 (tradename, styrene/acrylic acid copolymer, MW: 6,800, AV: 250, manufactured by Johnson Polymer Corp.) . . . 0.08 wt %
(Additives for resin dispersant)
  Aminomethyl propanol . . . 0.8 wt %
(Resin emulsion)
  Polystyrene resin emulsion (resin solid content: 50 wt %, MFT: 100° C.) . . . 0.4 wt %

(Anionic surfactant)

Levenol WZ (tradename, polyoxyethylene alkylphenyl ether sodium sulfate, active ingredient: 26 wt %, manufactured by Kao Corp.) . . . 1.0 wt %
(Saccharides)
    Ribose . . . 3.0 wt %
    Cellobiose . . . 2.5 wt %
    α-Cyclodextrin . . . 5.0 wt %
(pH adjustor)
    Potassium phosphate . . . 0.62 wt %
(Water)
    Ultrapure water . . . 80.6 wt %

A magenta ink of Example 11 was prepared according to the above formulation in the same manner as in Example 1.

In this ink of Example 11, potassium phosphate was added as a pH adjustor.

Example 12

(Pigment)
    Phthalocyanine blue E (C.I. Pigment Blue 15:6) . . . 23.0 wt %
(Resin dispersant)
    Styrene/methacrylic acid copolymer . . . 5.29 wt %
(Additive for resin dispersant)
    Triethanolamine . . . 4.0 wt %
(Resin emulsion)
    Polystyrene resin emulsion (resin solid content: 35 wt %, MFT: 110° C.) . . . 8.0 wt %
(Anionic surfactant)
    Hitenol 12 (tradename, polyoxyethylene alkyl ether ammonium sulfate, active ingredient: 92 wt %, manufactured by Dai-ichi Kogyo Seiyaku Co., Ltd.) . . . 1.36 wt % . . .
(Saccharides)
    Sucrose . . . 21.7 wt %
(Water)
    Ultrapure water . . . 36.65 wt %

A cyan ink of Example 12 was prepared according to the above formulation in the same manner as in Example 1.

Comparative Example 1

(Pigment)
    Carbon Black MCF-88 (tradename, manufactured by Mitsubishi Kasei Corp.) . . . 7.5 wt %
(Resin dispersant)
    Styrene/acrylic acid/ethyl acrylate copolymer (acid value 153, weight-average molecular weight 10,000) . . . 2.5 wt %
(Additives for resin dispersant)
    Monoethanolamine . . . 0.75 wt %
(Water-soluble organic solvents)
    Ethylene glycol . . . 10.5 wt %
    Diethylene glycol . . . 10.0 wt %
    Ethanol . . . 6.5 wt %
(Resin emulsion)
    PB-300 (tradename, manufactured by Kao Corp.) . . . 20.0 wt %
(Water)
    Ultrapure water . . . 42.25 wt %

An ink composition was prepared as follows.

At the outset, a styrene/acrylic acid/ethyl acrylate copolymer, monoethanolamine, ultrapure water, and ethylene glycol were mixed together, and the mixture was heated to 70° C. to completely dissolve the resin. The carbon black and ethanol were then added to the solution, followed by premixing for about 30 min. Thereafter, Eiger Motormill (manufactured by Eiger Japan K. K.) was used to disperse the carbon black under conditions of bead loading 70% and media diameter 0.7 mm until the average particle diameter of the pigment was reduced to 100 nm. After the completion of the dispersing procedure, diethylene glycol and PB-300 were added to and mixed with the dispersion while stirring by means of a mechanical stirrer for one hr. The mixture was filtered under pressure through a 5-μm membrane filter to prepare a black ink of Comparative Example 1.

In this ink of Comparative Example 1, neither the saccharide nor the anionic surfactant having a polyoxyethylene group was added.

Comparative Example 2

A black ink of Comparative Example 2 was prepared in the same formulation and manner as in Example 1, except that Hitenol N07, an anionic surfactant having a polyoxyethylene group, was not added and the ultrapure water was used in an amount of 70.88% by weight.

Preparation of recording medium

Recording medium 1
(Water-soluble resin)
    Polyvinyl alcohol (tradename: Denka Poval K-17, saponification value 99 mol %, MW: 75,000, manufactured by Denki Kagaku Kogyo K. K.) . . . 10.0 wt %
(Water)
    Ultrapure water . . . 90.0 wt %

The above ingredients were mixed and dissolved in each other to prepare a resin solution which was then coated on a 100 μm-thick PVC film by means of a bar coater, followed by drying in a thermostatic chamber of 60° C. for 2 days to prepare a recording medium 1 having a resin layer thickness of 10 μm.

Recording medium 2
(Water-soluble resin)
    Partially butyrated polyvinyl alcohol (tradename: BX-5, manufactured by Sekisui Chemical Co., Ltd.) . . . 10.0 wt %
(Organic solvent)
    Ethanol . . . 45.0 wt %
    Toluene . . . 45.0 wt %

The above ingredients were mixed and dissolved in each other to prepare a resin solution which was then coated on a 100 μm-thick PET film by means of a bar coater, followed by drying to prepare a recording medium 2 having a resin layer thickness of 30 μm.

Recording medium 3
(Water-soluble resin)
    Polyvinyl alcohol (tradename: Kuraray Poval PVA 117, saponification value 99 mol %, MW: 90,000, manufactured by Kuraray Co., Ltd.) . . . 1.0 wt %
(Additives)
    Silica (average particle diameter 15 μm, average pore diameter 150 Å, pore volume 1.6 cc/g) . . . 1.0 wt %
    Alumina (tradename: AS-3 (solid content 7 wt %), manufactured by Catalysts and Chemicals Industries Co., Ltd.) . . . 25.0 wt %
(Water)
    Ultrapure water . . . 73.0 wt %

The above ingredients were mixed by stirring and a mixture was then coated on a PET film by means of a bar coater, followed by drying in a thermostatic chamber of 150° C. for 3 hr to prepare a recording medium 3 having a resin layer thickness of 5 μm.

Recording medium 4

A recording medium 4 having a resin layer thickness of 10 μm was prepared in the same formation and manner as described above in connection with the recording medium 3, except that Hitenol N07, an anionic surfactant, was added in an amount of 0.5% by weight and the ultrapure water was added in an amount of 72.5% by weight.

Recording medium 5
(Water-soluble resin)
Styrene/acrylic acid copolymer(tradename: Joncryl 68 (MW: 10,000, AV: 195, manufactured by Johnson Polymer Corp.) . . . 10.0 wt %
(Additives for water-soluble resin)
Aqueous ammonia (28 wt %) . . . 3.0 wt %
(Water)
Ultrapure water . . . 87.0 wt %

The above ingredients were mixed and dissolved in each other to prepare a resin solution which was then coated on a 100 μm-thick PVC film by means of a bar coater, followed by drying in a thermostatic chamber of 60° C. for 2 days to prepare a recording medium 5 having a resin layer thickness of 20 μm.

Recording medium 6
A recording medium 6 having a resin layer thickness of 25 μm was prepared in the same formation and manner as described above in connection with the recording medium 5, except that Nissan Nonion K-230 (tradename, polyoxyethylene lauryl ether, manufactured by Nippon Oils & Fats Co., Ltd.), a nonionic surfactant, was added in an amount of 0.5% by weight and the ultrapure water was added in an amount of 86.5% by weight.

Recording medium 7
A recording medium 7 having a resin layer thickness of 15 μm was prepared in the same formation and manner as described above in connection with the recording medium 5, except that Hitenol N07, an anionic surfactant, was added in an amount of 0.5% by weight and the ultrapure water was added in an amount of 86.5% by weight.

Evaluation of properties of ink composition
The properties of the above ink compositions were evaluated as follows.

Evaluation 1: clogging of nozzle
The ink composition was filled into a head of MJ-700V2C (tradename, manufactured by Seiko Epson Corporation), and all the nozzles were confirmed to satisfactorily eject the ink under conditions of response frequency 3.6 kHz, resolution 360 dots/inch, and amount of ink ejection 50 ng/dot. The head was then allowed to stand without capping under conditions of 40° C. and 25% RH for two weeks. Thereafter, cleaning operation of the head was performed, followed by printing on XEROX-P (tradename, manufactured Fuji Xerox Co., Ltd.). Evaluation was done, for clogging of the nozzles due to drying of the ink, based on the number of cleaning operations necessary for eliminating such an ejection problem that ink droplets are ejected with trajectories non-perpendicular to the print head, or the ink could not be ejected.

Evaluation criteria were as follows.

A: Repetition of 0 to 3 cleaning operations was necessary for yielding an image having quality equal to that obtained in the original printing.

B: Repetition of 4 to 6 cleaning operations was necessary for yielding an image having quality equal to that obtained in the original printing.

C: Repetition of 7 to 10 cleaning operations was necessary for yielding an image having quality equal to that obtained in the original printing.

D: The ejection problem could not be solved even after repetition of 11 or more cleaning operations.

Evaluation 2: Intermittent ink ejection stability The ink was loaded in MJ-700V2C, and an image was printed by one line under the same conditions as used above in the evaluation of the ink as to clogging of the nozzle due to drying of the ink in an environment of 15° C. and 20% RH. Thereafter, the formation of the image was suspended for a given period of time and then restarted. The stability of the ink was evaluated based on the suspension time which caused the first dot at the restart of the image formation to be missed or to be ejected with a trajectory non-perpendicular to the print head.

Evaluation criteria were as follows.

A: Suspension time of 20 sec or longer

B: Suspension time of 10 to 20 sec

C: Suspension time of 5 to 10 sec

D: Suspension time of less than 5 sec

Evaluation 3: Image quality

The ink was loaded in MJ-700V2C, and an image was printed on recording media 1 to 4, prepared above, under conditions of response frequency 3.6 kHz, resolution 360 dots/inch, and amount of ink ejection 50 ng/dot in an environment of 20 to 25° C. and 40 to 60% RH. The printed image in its blotted image area was examined visually and under a microscope (magnification: 100 times).

Evaluation criteria were as follows.

A: The results of both the visual examination and the examination under a microscope showed the absence of dropout in the blotted image area.

B: The results of the examination under a microscope showed the presence of some dropout in the blotted image area, with the results of the visual examination showing the absence of dropout in the blotted image area.

C: The results of the visual examination showed slight dropout in the blotted image area.

D: Dropouts were easily found in the blotted image area by the visual examination.

The results of the above tests were as summarized in the following table.

TABLE 1

|  | Evaluation 1 | Evaluation 2 | Evaluation 3 Recording medium | | | | | | |
|---|---|---|---|---|---|---|---|---|---|
|  |  |  | 1 | 2 | 3 | 4 | 5 | 6 | 7 |
| Ex. 1 | A | A | A | A | A | A | B | B | B |
| 2 | A | A | A | A | A | A | B | B | A |
| 3 | A | A | A | A | A | A | B | B | A |
| 4 | A | A | A | A | A | A | B | B | B |
| 5 | A | B | A | A | B | A | B | B | B |
| 6 | B | A | A | A | A | A | B | B | A |
| 7 | A | A | A | A | A | A | A | A | A |
| 8 | B | B | A | A | A | A | B | B | B |
| 9 | A | A | A | B | B | B | B | B | B |
| 10 | A | A | A | A | A | A | B | A | A |
| 11 | A | A | A | A | A | A | B | B | B |
| 12 | A | A | A | A | A | A | B | B | B |
| Comp. 1 | D | D | D | D | D | D | D | D | D |
| Ex. 2 | A | A | C | C | D | C | D | D | C |

Evaluation 4: Image quality (OD value)

The reflection OD value of the image, formed in the above evaluation 3, in its blotted image area was measured with Macbeth PCMII.

The results were as tabulated in the following Table 2.

TABLE 2

| | Evaluation 4 Recording medium | | | |
| --- | --- | --- | --- | --- |
| | 1 | 2 | 3 | 4 |
| Ex. 1 | 1.78 | 1.81 | 1.96 | 2.01 |
| Ex. 13 | 1.61 | 1.68 | 1.74 | 1.80 |

What is claimed is:

1. An ink jet recording method comprising the steps of: ejecting droplets of an ink composition and depositing the droplets onto a recording medium to form an image, the ink composition comprising a pigment as a colorant, an anionic surfactant having a polyoxyethylene group, a dispersant, and water, the recording medium comprising a substrate bearing a layer comprising a water-soluble resin.

2. A record medium recorded by the recording method according to claim 1.

3. The method according to claim 1, wherein the ink composition comprises about 0.5 to 30% by weight of the pigment, about 0.01 to 5.0% by weight of the anionic surfactant, and about 0.05 to 30% by weight of the dispersant.

4. The method according to claim 1, wherein the ink composition comprises a resin emulsion and/or a saccharide.

5. The method according to claim 4, wherein the ink composition comprises 0.5 to 30% by weight of the pigment, 0.1 to 5% by weight, in terms of resin solid content, of the resin emulsion, 0.01 to 5% by weight of the anionic surfactant having a polyoxyethylene group, and 0.1 to 40% by weight of the saccharide.

6. The method according to claim 1, wherein the anionic surfactant is polyoxy-ethylene nonylphenyl ether sulfate.

7. The method according to claim 1, wherein the dispersant is a styrene/acrylic acid copolymer.

8. The method according to claim 7, wherein the styrene/acrylic acid copolymer has a molecular weight of 1,600 to 25,000 and an acid value of 100 to 250.

9. The method according to claim 1, wherein the ink composition further comprises 0.1 to 30% by weight of a humectant.

10. The method according to claim 1, wherein the water-soluble resin is selected from polyvinyl alcohol and/or a polyvinyl alcohol derivative.

11. A record medium recorded by the recording method according to claim 3.

12. A record medium recorded by the recording method according to claim 4.

13. A record medium recorded by the recording method according to claim 5.

14. A record medium recorded by the recording method according to claim 6.

15. A record medium recorded by the recording method according to claim 7.

16. A record medium recorded by the recording method according to claim 8.

17. A record medium recorded by the recording method according to claim 9.

* * * * *